May 22, 1945.  C. S. KELLEY  2,376,490
CONTROL VALVE DEVICE
Filed Dec. 23, 1943

INVENTOR
Cecil S. Kelley
BY
A. M. Higgins
ATTORNEY

Patented May 22, 1945

2,376,490

UNITED STATES PATENT OFFICE 2,376,490

CONTROL VALVE DEVICE

Cecil S. Kelley, Forest Hills, Pa., assignor to The Westinghouse Air Brake Company, Wilmerding, Pa., a corporation of Pennsylvania Application December 23, 1943, Serial No. 515,389

7 Claims. (Cl. 303—54)

This invention relates to control valve devices of the self-lapping type for use in controlling fluid pressure systems, such for instance, as fluid pressure brake systems for railway vehicles and automotive vehicles, fluid pressure airplane control systems, fluid pressure controlled clutch systems and fluid pressure controlled ship and engine control systems, etc.

An object of the invention is to provide an improved control valve device of the above mentioned type.

Another object of the invention is to provide a control valve device of the above-mentioned type having improved means for maintaining the operating handle thereof in any control position to which it is moved, against accidental movement to any other control position. According to this object a friction means is provided which at all times loads the handle sufficiently to resist any tendency to move accidentally from any control position to which it has been moved.

Another object of the invention is to provide a control valve device of the above-mentioned type having means for maintaining a chosen predetermined pressure in the control pipe when the operating handle thereof is disposed in a certain control position. According to this object an adjusting means is provided for loading the regulating mechanism of the control valve device to the desired degree to provide a chosen pressure in the control pipe when the operating handle thereof is moved to a certain control position.

Other objects and advantages will appear in the following more detailed description of the invention.

Figure 1:
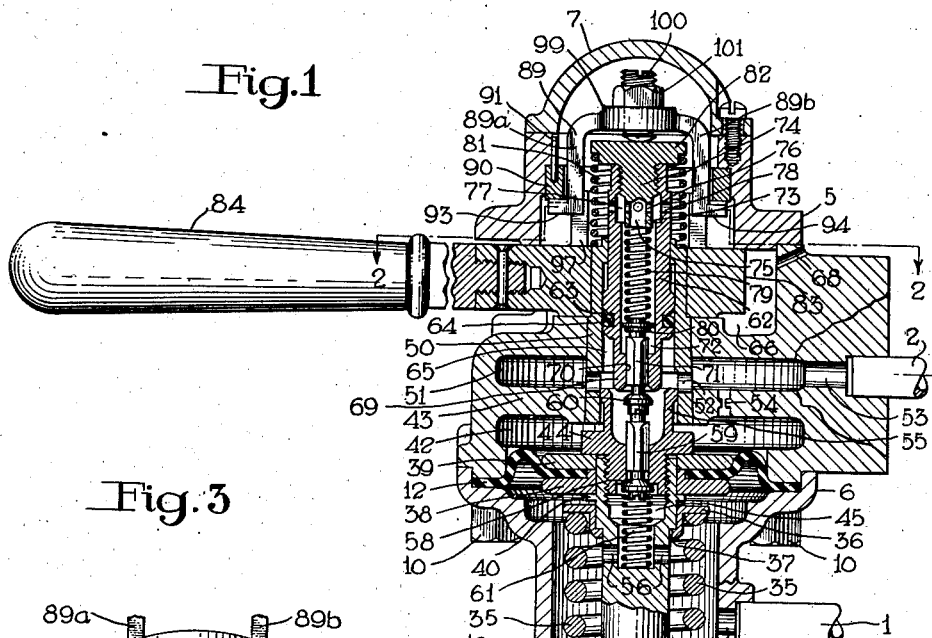
Figure 3:
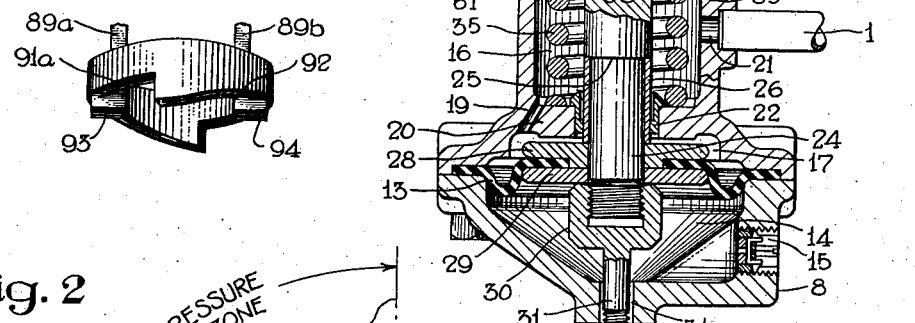
Figure 2:
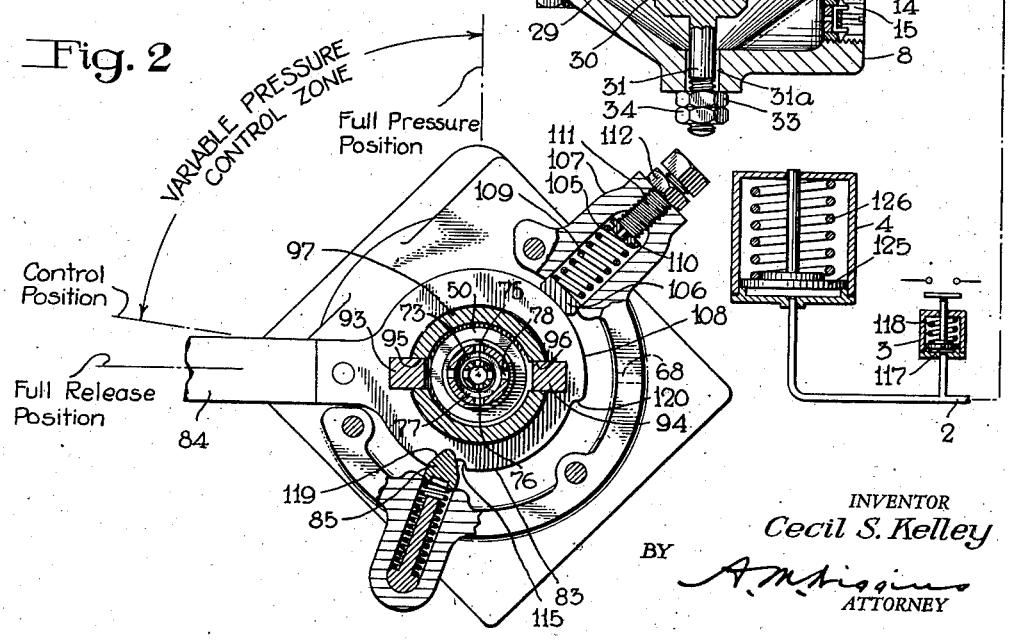

Fig. 1 is a vertical sectional view through a control valve device constructed in accordance with the invention; Fig. 2 is a cross sectional view through the device and taken on the line 2—2 on Fig. 1; Fig. 3 is a perspective view of a portion of the valve device.

For description purposes only it will be assumed that the improved control valve device is employed in a fluid pressure controlled system having a supply or inlet pipe 1 leading from a fluid pressure supply source (not shown) and a control pipe 2 leading to a fluid pressure motor 3 and a fluid pressure motor 4 which operate in accordance with variations in the pressure of fluid in the control pipe. In the present system it will be assumed that the motors 3 and 4 are of the usual well known type and that a predetermined increase in pressure in the control pipe 2, such for instance thirteen pounds, will effect operation of the fluid pressure motor 3 to close a switch or the like, but that such an increase in pressure will be insufficient to effect operation of the fluid pressure motor 4.

The control valve device comprises a casing having an upper body portion 5, a lower body portion 6, a top cover portion 7 and a bottom cover portion 8. As shown, these casing portions are made separate from each other and are vertically arranged in axial alignment, the upper end of the lower body portion 6 and the lower end of the upper body portion 5 being secured together by means of studs (not shown) and nuts 10. The top cover portion 7 and the bottom cover portion 8 are secured to the upper end of the upper body portion 5 and the lower end of the lower body portion 6 respectively, in any suitable manner, such as the manner shown in Fig. 1 of the drawing.

A flexible diaphragm 12 is clamped around its edge between the upper and lower body portions 5 and 6, respectively, and an oppositely arranged axially aligned flexible diaphragm 13 is clamped around its edge between the lower body portion 6 and the bottom cover portion 8. A chamber 14 is formed between the diaphragm 13 and bottom cover portion 8, which chamber is in constant open communication with the atmosphere through a breather opening provided in an insect excluder 15 screwed into the cover portion 8. The adjacent faces of the two diaphragms 12 and 13 are open to chambers 16 and 17 respectively, which are in permanent open communication with each other through a passage 19 provided in an annular wall 20 extending inwardly from the lower body portion 6 above the diaphragm 13. Chamber 16 and thereby chamber 17 are in constant open communication with the inlet or supply pipe 1 by way of a passage 21 formed in the casing.

The wall 20 has a bore lined with a wear bushing 22 arranged in axial alignment with the two diaphragms. A stem 24 extends through this bushing and centrally through the diaphragm 13 into chamber 14. Above the wall 20 the stem 24 is increased in cross-sectional area to provide a shoulder 25, a wear sleeve 26 is mounted on the lower end portion of the stem with its upper end in engagement with said shoulder. The sleeve 26 extends through the bushing 22 in sliding contact therewith and its lower end contacts a follower 28 which is disposed in chamber 17 in contact with the upper side of a diaphragm 13. The stem 24 extends through suitable aligned openings in the follower 28 and a follower 29 disposed at the opposite side of the diaphragm 13. Within the chamber 14 a nut 30 is provided which has screw-threaded connection with the lower end of the stem, which nut serves to clamp the followers 28 and 29 together and to the diaphragm 13 and to the stem 24, the nut acting directly upon the follower 29 and indirectly through the medium of the stem, shoulder 25 and sleeve 26, upon the follower 28. The nut 30 is provided with a stem 31 which extends downwardly through a suitable opening 31a provided in the bottom cover portion 8 to the exterior of the casing. The outer end of this stem is screw-threaded to receive an adjusting nut 33 and a lock nut 34 for a purpose hereinafter described.

The wall 20 supports one end of a control spring 35 contained in chamber 16. The opposite end of this spring bears against an annular spring seat 36 which is slidably mounted on stem 24 and urged by said spring into contact with a stop shoulder 37 on said stem. The spring 35 is operative to oppose downward movement of the stem 24 and thereby of diaphragms 12 and 13 from the position in which they are shown in Fig. 1, as will be later described.

The central portion of diaphragm 12 is clamped between two followers 38 and 39, the follower 38 engaging a collar 40 provided on stem 24 which stem extends through follower 38, diaphragm 12 and follower 39 into a chamber 42 defined by the upper face of diaphragm 12 and a wall 43 provided in the upper body portion 5. A nut 44 disposed in chamber 42 has screw-threaded engagement with the wall of a bore 45 provided in the upper end of the stem 24 and is tightened against the follower 39 for clamping the two followers to the opposite faces of the diaphragm 12 and for thereby securing the upper end of stem 24 to said diaphragm.

The upper body casing 5 is provided with an axial bore lined with a sleeve 50 one end of which is open to the pressure chamber 42 above the diaphragm 12. Above the chamber 42 is a chamber 51 which is separated from chamber 42 by the wall 43, which chamber 51 is open to the interior of the sleeve 50 through a plurality of ports 52 in the sleeve. The chamber 51 is in constant open communication with the control pipe 2 by way of a passage 53 provided in the upper casing portion 5. This chamber 51 is also connected through a stabilizing choke 54 to the chamber 42.

The nut 44 above diaphragm 12 has an upwardly extending sleeve-like projection 55, the end of which is mounted to slide in the lower and adjacent end of sleeve 50 below the port 52. The bore 45 in the diaphragm connecting stem 24 is in permanent communication through one or more bores 56 with chamber 16 and contains a fluid pressure supply valve 58. This valve has a fluted stem 59 extending through an axial bore in the nut into the sleeve-like projection 55 thereof, wherein it contacts a fluid pressure release valve 60. The nut 44 is provided with a seat for engagement by the supply valve 58, and a spring 61 contained in bore 45 below the nut acts on said valve for urging same into contact with said seat.

A plunger 62 is slidably mounted in sleeve 50 above the release valve 60 and is provided with an annular groove 63 containing a sealing ring 64 contacting the bottom of said groove and the inner wall of said sleeve for preventing leakage of fluid under pressure from a chamber 65 below the sealing ring to a chamber 66 above the sleeve 50.

The chamber 65 is in permanent communication with the interior of the sleeve-like portion 55 of the nut 44 and through the ports 52 with the chamber 51. The chamber 66 above the sealing ring 64 is in constant communication with the atmosphere through a port 68.

The plunger 62 has a lower end portion 69 of reduced diameter which extends into chamber 65 and which is provided with an axial bore 70 which opens through a valve seat provided in the portion 69, which seat is provided for engagement by the release valve 60. The release valve has a fluted stem 71 extending through this seat and bore into the lower end of an axial bore 72 in the plunger. The upper end of bore 72 is closed by a spring seat 73 carried by a nut 74 which has screw-threaded engagement with the upper end of the plunger 62. The spring seat 73 is provided with a central bore 75 and cross ports 76 which connect bore 72 with a counter bore 77 of enlarged diameter which is in constant open communication with atmospheric chamber 66 by way of a plurality of ports 78 in the plunger 62. A coil spring 79 is disposed in bore 72 under pressure and acts at one end on the spring seat 73 and at the opposite end on a spring seat 80 carried at the end of the fluted stem 71 of release valve 60 to bias the release valve 60 to its open position.

A coil biasing spring 81 encircles the portion of the plunger 62 extending above the sleeve 50 and is supported at one end on a spring seat provided at the upper end of the sleeve and the opposite end bears against a collar 82 carried by the nut 74. This spring is under relatively light pressure for biasing the plunger 62 in an upward direction and out of seating contact with the release valve 60.

Disposed in chamber 66 is a quadrant 83 which may be rotated about the sleeve 50 by means of an attached operating handle 84. As shown in Fig. 2 of the drawing this quadrant is notched for engagement with a spring pressed detent 85 so that three definite handle positions may be felt in full ninety degree movement of said handle for reasons hereinafter described.

For controlling the operation of the plunger 62 and thereby the supply and release valves 58 and 60, respectively, by rotary movement of the operating handle 83 a cam mechanism is provided. This mechanism comprises a cam yoke member 89 constructed and arranged to operatively engage a cam member 90 which is maintained stationary by means of a pin 91 which is mounted in the member and which interlock with the upper body casing 5.

As best shown in Fig. 3 of the drawing the cam member is provided with a cam face 91a and a cam face 92, which faces are operatively engaged by a pair of spaced members 93 and 94, respectively, which form the lower ends of vertically disposed spaced legs 89a and 89b of the yoke member 89. The members 93 and 94 are mounted in suitable spaced slots 95 and 96 provided in an upwardly extending portion 97 of the quadrant 83 and are rotatable therewith upon rotary movement of the handle 86. The spaced legs 89a and 89b straddle the spring 81 and at the top of the yoke are joined together by a body portion 99 extending across the top of the nut 74. The body portion 99 is provided with a central bore into which an adjusting screw 100 is threaded. The lower end of this screw engages the upper surface of the nut 74 to establish connection between the yoke member 89 and said plunger. A lock nut 101 mounted on screw 100 is arranged to engage the top surface of the body portion 99 for securing the screw 100 in any chosen adjusted position.

For preventing accidental movement of the operating handle 83 from one control position to another, a friction loading means 105 is provided. As shown in Fig. 2 of the drawing, the friction loading means comprises a shoe 106 slidably mounted in a bore provided in a radially outwardly extending boss 107 carried by the upper body portion 5. One side of the shoe 106 is arranged to frictionally engage a semicircular portion 108 of the quadrant 83 and is maintained in engagement with said surface by means of a spring 109. The spring 109 is interposed between the opposite side of the shoe 106 and an adjustable spring seat 110 which is engaged by an adjusting screw 111. A lock nut 112 mounted on screw 111 is arranged to engage the outer surface of the boss 107 for securing the screw 111 and thereby the spring seat 110 in an adjusted position.

*Adjusting the control valve device for operation*

When the control valve device is embodied in a fluid pressure system and the fluid pressure source and thereby the chambers 16 and 17 of the control valve are charged with fluid under pressure and it is desired to condition the system for use, the lock nut 34 and the adjusting nut 33 are loosened to permit movement of the stem 31 relative to the bottom cover portion 8. The top cover portion 6 is then removed and the operating handle 84 of the control valve device rotated from the position in which it is shown in the drawing to its control position in which the spring pressed detent 85 engages the quadrant 83 in the notch 115. With the handle thus positioned the lock nut 101 on the adjusting screw 100 is loosened and the adjusting screw rotated in either a clockwise or counterclockwise direction until some predetermined chosen pressure, such for instance as thirteen pounds, is obtained in the chambers 42 and 51 and thereby in control pipe 2, the screw serving to effect the operation of the supply and release valves to provide such pressure as will be hereinafter fully described. It should here be mentioned that the usual pressure gage (not shown) located at the operator's station will indicate when this pressure is attained.

When the chosen predetermined pressure is attained in the chamber and control pipe the lock nut 101 is rotated into engagement with the upper surface of the body portion 99 of the cam yoke member 89 to lock said adjusting screw in its adjusted position. With the adjusting screw 100 thus locked in position the top cover portion 7 is assembled and clamped in place. The operating handle 84 is then moved to a position intermediate the control position and the full release position. With the operating handle in this position the nut 33 is rotated into engagement with the lower wall of the bottom cover portion 8. Continued rotation of the nut 33, due to its screw-threaded connection with the stem 31, will cause downward movement of the stem 31 and attached stem 24 relative to the end 69 of the plunger 62 causing the spring 35 to be compressed, diaphragm 12 deflecting downwardly to permit such movement of the stem 24. The downward movement of the stem 24 is continued until the release valve 60 just moves out of engagement with its seat on the end 69 of the plunger 62. This can readily be determined by a decrease in the pressure of fluid in the control pipe 2, such decrease being registered by the hereinbefore mentioned pressure gage. Upon obtaining the proper adjustment of the release valve 60 in this position of the operating handle, the lock nut 34 is rotated to engage the nut 33 to thereby lock the nut 33 in its adjusted position. With the control valve device adjusted as just described, thirteen pounds pressure per square inch should be obtained in the control pipe 2 when the operating handle of the control valve device is moved to the control position and zero pressure when the handle is returned to full release position in which the spring pressed detent 85 enters the notch 119 in the quadrant. When the handle is moved into a variable pressure control zone between the control position, i. e., the position in which the detent is in the notch 115, and a full pressure position which is determined by the spring pressed detent 85 engaging a shoulder 120 on the quadrant 83, the pressure will be varied between thirteen and fifty pounds in accordance with the position of the handle.

*Operation*

With the operating handle 84 and the attached quadrant 83 in their full release position as shown in Figs. 1 and 2 of the drawing, the spring pressed detent 85 will engage the quadrant 83 in the notch 119. With the several parts of the control valve device properly adjusted and the quadrant in the position shown in the drawing, the spring 81 acts through the medium of the nut 74, adjusting screw 100 and the yoke member to maintain the members 93 and 94 of the yoke member in engagement with the low surface of the cam faces 91a and 92 respectively. With the members 93 and 94 thus positioned, the plunger 62 will be in the position in which it is shown in the drawing. With the plunger in this position, the spring 61 will seat the supply valve 58 and spring 79, acting on the stem 71 of the release valve 58, will maintain said release valve in contact with the end of the supply valve stem 59 and thus unseated from the end of the plunger portion 69. As a result chamber 65 below the plunger is open to the atmosphere by way of the unseated release valve 60, bore 72 in the plunger 62, central bore 75 in spring seat 73, cross ports 76, bore 77, ports 78 in plunger 62, chamber 66 and passage 68. Since the chamber 51 and connected control pipe 2 are open to chamber 65 by way of passages 52, and the chamber 42 is open to chamber 51 through the stabilizing choke 54, these chambers and the control pipe will also be open to the atmosphere with the plunger 62 in the position in which it is shown in the drawing. With the control pipe devoid of fluid under pressure the operating parts of both the fluid pressure motors 3 and 4 will be maintained in the position in which they are shown in the drawing.

If, when the fluid pressure supply pipe 1 and thereby the chambers 16 and 17 of the control valve device are charged with fluid under pressure, it is desired to supply fluid under pressure to the control pipe 2 to effect operation of the fluid pressure motor 3, the operating handle 84 of the control valve device is rotated in a clockwise direction from the position in which it is shown in Figs. 1 and 2 of the drawing to a position in which the spring pressed detent 85 will engage the quadrant in notch 115. Movement of the handle in a clockwise direction causes the quadrant 83 and thereby the yoke member, including the members 93 and 94 carried at the end of the legs 89a and 89b, respectively, to move in the same direction. Since the members 93 and 94 engage the cam faces 91a and 92, respectively, the yoke member 89 is caused to move downwardly from the position in which it is shown in Fig. 1 of the drawing. This downward movement of the yoke member 89 acting through the medium of the adjusting screw 100 causes the plunger 62 to move in the same direction against the light biasing force of spring 78. The downward movement of the plunger 62 will be relative to the release valve 60 until such time as the seat for said valve on the portion 69 of plunger 62 engages the valve. With the valve thus seated, communication between the bore 70 in the plunger which is open to the atmosphere through the circuit hereinbefore traced, and connected chambers 65, 51, 42 and control pipe 2. The operating handle 84 as its rotation is continued acts through the medium of the cam mechanism in the manner above described, to move the release valve 58 with the plunger 62, and the release valve will act through the medium of stem 59 to unseat the supply valve from the end of the nut 44 secured to diaphragm 12.

When the supply valve 58 is thus unseated, fluid under pressure will flow from chamber 16 past said valve to chamber 65, and thence through ports 52 to chamber 51 from when it flows to the control pipe 2 and the connected fluid pressure motors 3 and 4. Fluid under pressure supplied to chamber 51 also flows through the stabilizing choke 54 to chamber 42 above the diaphragm 12. The stabilizing choke is provided to prevent the pressure in diaphragm chamber 42 increasing substantially ahead of the pressure in the control pipe 2.

The pressure of fluid thus supplied to chamber 42 acts on diaphragm 12 in opposition to the force of control spring 35, and when this pressure is increased to a degree which overcomes the force of said spring, the diaphragm 12 will deflect downwardly relative to the supply valve 58 and finally move the supply valve seat into engagement therewith. The pressure in chamber 42 and thereby the connected chamber 51 and control pipe 2 is increased to a degree determined by the extent of such downward movement of the plunger after seating engagement with the release valve 60.

It should here be understood that when the operating handle 84 of the control valve device is positioned in the control position, determined by the spring pressed detent 85 engaging the quadrant 83 in the notch 115, some chosen predetermined pressure such for instance thirteen pounds will be obtained in the control pipe 2. This increase in pressure of fluid in control pipe 2 and acting on piston 117 in the fluid pressure motor 3 in opposition to a spring 118, will overcome the force of said spring and cause the piston 117 to move upwardly to perform some mechanical operation, such for instance as closing a switch, but will not be sufficient to effect operation of the fluid pressure motor 4.

If it is desired to effect operation of the fluid pressure motor 4 the pressure of fluid in the control pipe 2 must be increased a slight degree above said predetermined pressure (thirteen pounds). To effect such an increase in pressure in the control pipe, the handle 84 of the control valve device is moved in a clockwise direction from the control position to a position in the variable pressure control zone, i. e., between notch 115 and shoulder 120. The handle 84 acting through the medium of the connected quadrant 83 and cam mechanism will effect further downward movement of the plunger 62 and this movement of the plunger will again unseat the supply valve 58. With the supply valve 58 again unseated, fluid under pressure again flows from chamber 16 to chambers 65, 51 and 42 which are connected to control pipe 2. When the pressure of fluid in the control pipe and in the chambers 65, 51 and 42 is increased to a degree sufficient for deflecting the diaphragm 12 downwardly against the opposing power of spring 35 to a position for again seating the supply valve 58, the flow of fluid will be cut off to thereby again limit the pressure attained in said control pipe in accordance with the new position of the operating handle 84 in the variable pressure control zone.

It will be evident that the pressure in the control pipe 2 may be further increased by moving the operating handle 84 farther in a clockwise direction in the variable pressure control zone, from the control position in which the spring pressed detent engages the quadrant in the notch 115. If desired a maximum degree of pressure can be attained in said control pipe and chambers by movement of the operating handle to a position in which the spring pressed detent 85 engages a stop 120 carried by the quadrant.

It will also be evident that the pressure of fluid supplied to the control pipe 2 acts on one face of a piston 125 in fluid pressure motor 4 in opposition to a spring 126 and that when the pressure in the control pipe is increased above said predetermined degree it will overcome the force of said spring and cause the piston to move upwardly. Upward movement of the piston 125 may be employed to operate means to perform some desired operation.

It will be noted that the friction loading means 105 opposes movement of the quadrant 83 and thereby the operating handle 84 but the total opposition to movement will be negligible and may be overcome by a manual pressure of around five pounds. However, this force acting to oppose movement of the quadrant will be sufficient to prevent accidental movement of the handle so that the handle will remain stationary in any position within the variable pressure zone to which it may have been moved by the operator.

If, after the pressure in the control pipe 2 has been increased sufficiently to effect movement of the piston 125 in the fluid pressure motor 4 in one direction and it is now desired to effect movement of this piston in the opposite direction, the operating handle 84 of the control valve device is gradually moved from its position in the variable pressure zone in a counterclockwise direction toward the said control position. Each successive step of the operating handle in a counterclockwise direction causes the connected quadrant 83 and cam yoke 89 to move in the same direction. The cam yoke 89 as it moves in this direction causes the members 93 and 94 which engage the cam faces 91a and 92, respectively, to rotate in a direction toward the low point on said cam, so that the yoke member moves gradually in an upwardly direction. As the yoke member is thus gradually moved upwardly, the force exerted on the plunger nut 74, through the medium of the adjusting screw 100, is gradually reduced and plunger 62 will be allowed to move upwardly under the action of the spring 78. With the diaphragm 12 in a balanced condition by the pressure of fluid in chamber 42 and the opposing pressure of spring 35, this upward movement of the plunger 62 will be relative to the release valve 60 since this valve will be maintained in contact with the supply valve stem 59 by the pressure of spring 79. As a result, the portion 69 of the plunger 62 will move out of seating engagement with the release valve 60 to thereby allow fluid under pressure to flow from the chambers 65 and 51 and connected control pipe 2 and chamber 42 above the diaphragm 12 to the atmosphere through the circuit hereinbefore traced. The pressure of fluid in diaphragm chamber 42 acting on diaphragm 12 and opposing that of spring 35 will therefore be reduced and said spring will accordingly deflect the diaphragm 12 upwardly in accordance with the degree of such reduction. As the diaphragm 12 is thus moved upwardly, the supply valve 58 and release valve 60 will be moved therewith by spring 61 in the direction of the reduced portion 69 of the plunger 62.

As the handle is being moved in a counter-clockwise direction, the pressure of fluid in diaphragm chamber 42 and control pipe 2 will continue to reduce, and when the handle is stopped in the variable pressure zone, the release valve 60 is moved into engagement with its seat. This seating of the release valve 60 will then prevent further flow of fluid under pressure from chambers 65, 51 and 42 and thereby from the control pipe 2, thus limiting the pressure in said pipe and chamber to a degree determined by the position of the regulating handle 84 in the variable pressure control zone.

As the pressure of fluid in the control pipe 2 decreases in the manner above described, the force exerted on the piston 116 in the fluid pressure motor 4, tending to move said piston upwardly, is reduced. As a result of the reduction in pressure in the control pipe, the force exerted by the spring 126 on the piston 125 exceeds the opposing force of the fluid in the control pipe acting on the piston so that the piston is moved downwardly until brought to a stop by the opposing pressure of the fluid, thus effecting the desired operation of the fluid pressure motor 4 without effecting operation of the fluid pressure motor 3.

If it is desired to effect further downward movement of the piston 125 in the fluid pressure motor 4 without effecting operation of the fluid pressure motor 3, the operating handle 84 of the control valve device is rotated further in a counter-clockwise direction toward the control position for again unseating the release valve 60. A further release of fluid under pressure will then occur from the control pipe and associated chambers and the diaphragm 12 will again move upwardly for seating the release valve 60 to limit such reduction when the pressure in said pipe becomes reduced to a degree determined by the new position of the operating handle. As a result of the reduction in pressure in the control pipe, the spring 126 in the fluid pressure motor 4 acts to effect further downward movement of the piston 125.

It will thus be seen that downward movement of the piston 125 in the fluid pressure motor 4 will result from a reduction in pressure in the control pipe 2 and that the pressure in the control pipe may be reduced in as many steps or increments as desired the degree of each step of reduction depending upon the extent of rotary movement of the operating handle toward its control position.

When the operating handle is returned to its control position the pressure in the control pipe 2, acting on the piston 125 and 117 of the fluid pressure motors 3 and 4, respectively, will be reduced to the aforementioned predetermined value of thirteen pounds. Such a reduction in control pipe pressure will be sufficient to permit the spring 126 in the fluid pressure motor 4 to effect movement of the piston 125 to the position in which it is shown in the drawing but will be insufficient to permit the spring 118 in the fluid pressure motor 3 to effect operation of the piston 117 against the opposing pressure of fluid in the control pipe 2.

In the event that it is desired to effect operation of the piston 117 in the fluid pressure motor 3 from its upper position back to the position in which it is shown in the drawing, the operating handle 84 of the control valve device is returned to its full release position to effect a complete release of fluid under pressure from the control pipe 2 and associated chambers, thus permitting the spring 118 in the fluid pressure motor 3, acting in opposition to control pipe pressure, to move the piston 117 to the position shown.

It will be understood from the foregoing description in connection with adjusting the device for operation that when the operating handle of the control valve device is subsequently returned to full release position from the control position or from any position within the variable pressure control zone that a continuous and complete release of fluid under pressure from the control pipe 2 and the associated chambers 65, 51, and 42 will occur and that the spring 79 will maintain the release valve open.

Having now described my invention, what I claim as new and desire to secure by Letters Patent, is:

1. In a control valve device, in combination, a chamber a pair of coaxially aligned valves arranged to seat in the same direction and movable in unison, one of said valves being arranged to control a communication through which fluid under pressure may be supplied to said chamber and the other valve being arranged to control a communication through which fluid under pressure may be released from said chamber, a plunger capable of movement relative to said other valve and arranged to cooperate therewith to close the communication controlled thereby and then being operable to actuate said one valve to open the communication controlled thereby, a stationary cam member having a pair of cam faces, a yoke member having spaced members each engaging one of said cam faces, said yoke member straddling said plunger and operative to effect movement of the plunger, and rotatable means operable to control the operation of said yoke member.

2. In a control valve device, in combination, a chamber a pair of coaxially aligned valves arranged to seat in the same direction and movable in unison, one of said valves being arranged to control a communication through which fluid under pressure may be supplied to said chamber and the other valve being arranged to control a communication through which fluid under pressure may be released from said chamber, a plunger capable of movement relative to said other valve and arranged to cooperate therewith to close the communication controlled thereby and then being operable to actuate said one valve to open the communication controlled thereby, a stationary cam member having a pair of cam faces, a yoke member having spaced legs each engaging one of said cam faces, said yoke member straddling said plunger, means for operatively connecting said yoke member and said plunger, said means being adjustable to adjust the degree of movement of said plunger relative to said other valve, and rotatable means associated with said yoke member operable to control the operation of said plunger.

3. A self-lapping valve structure of the type having a pair of movable abutments cooperating to to form a pressure chamber normally charged with fluid under pressure in combination, a spring disposed in said pressure chamber acting on one of said abutments, a supply valve movable relative to said one abutment to open communication between said pressure chamber and a receiving chamber at the opposite side of said one abutment, said abutments being movable by pressure of fluid supplied to said receiving chamber against the opposing pressure of said spring and relative to said valve to close said communication, adjusting means associated with said pair of movable abutments for adjusting the pressure of said spring to insure a chosen increase in the pressure of fluid supplied to said receiving chamber, and means operative for moving said supply valve relative to said one abutment.

4. A self-lapping valve device of the type provided with a casing and a pair of movable abutments cooperating to form a pressure chamber normally charged with fluid under pressure, in combination, a stem, means connecting one end of said stem to one of said abutments, other means connecting the opposite end of said stem to the other of said abutments, a coil spring disposed in said chamber encircling said stem and bearing against said other abutment, a supply valve carried by said other means and arranged to move axially relative to said other abutment for opening a communication between said chamber and a receiving chamber at the opposite side of said other abutment for supplying fluid under pressure to said receiving chamber for moving said abutments against the opposing pressure of said spring, adjusting means associated with said means and said casing for adjusting the pressure of said spring to insure a chosen increase in the pressure of fluid supplied to said receiving chamber, and means for moving said supply valve axially relative to said other abutment.

5. A self-lapping valve device of the type provided with a casing and a pair of movable abutments cooperating to form a pressure chamber normally charged with fluid under pressure in combination, a strut, means including a nut connecting one end of said strut to one of said abutments, said nut having a stem extending to the exterior of said casing, other means connecting the opposite end of said strut to the other of said abutments, a coil spring disposed in said chamber encircling said strut and bearing against said other diaphragm, a supply valve movable relative to said other abutment to open communication between said chamber and a receiving chamber at the opposite side of said other abutment for moving said abutments against said spring and relative to said valve to close the communication, means for moving said valve relative to said other abutment, and means cooperating with said stem and said casing for adjusting the pressure of said spring to insure a chosen increase in the pressure of fluid supplied to said receiving chamber.

6. A self-lapping valve device comprising in combination, a movable abutment subject on one side to pressure of fluid in a chamber, a control spring acting on the opposite side of said abutment in opposition to pressure of fluid in said chamber, a supply valve for supplying fluid under pressure to said chamber, a seat for said supply valve movable by and with said abutment in the direction of said supply valve upon an increase in pressure in said chamber sufficient to overcome the opposing force of said spring, adjusting means operative to adjust the pressure of said spring to insure a chosen increase in the pressure of fluid supplied to said chamber, a release valve for releasing fluid under pressure from said chamber and having contact with said supply valve and operative to unseat same, a plunger having a seat for said release valve, said plunger being movable relative to said release valve and operable upon movement into engagement with said release valve for closing the fluid releasing communication from said chamber and being then operative to actuate said release valve to open said supply valve, means for adjusting the degree of movement of said plunger relative to said release valve, and means including a stationary cam member and a cooperating rotatable member for controlling the operation of said plunger.

7. A self-lapping brake valve device of the type having a movable abutment subject on one side to the pressure of fluid in a chamber and on the opposite side to the pressure of a control spring, in combination, a supply valve having a normal position engaging a seat on said movable abutment for closing a supply communication through which fluid under pressure may be supplied to said chamber, a release valve having a normal position for opening a communication through which fluid under pressure may be released from said chamber, a plunger having a seat for said release valve, said plunger having a normal position in which said seat is out of engagement with said release valve and movable relative to said release valve and arranged to cooperate therewith to close the release communication and then being operable to actuate said supply valve out of engagement with its seat to open the supply communication, said movable abutment being movable by pressure of fluid supplied to said chamber against said spring and relative to said supply valve to close the supply communication, rotatable means operative in one direction for moving said plunger out of said normal position to effect operation of said release valve to close the release communication and said supply valve to open said supply communication, adjustable means for adjusting the pressure of said control spring to insure a chosen increase in the pressure of fluid in said chamber upon operation of said rotary means a predetermined distance in said one direction, spring means operative upon movement of said rotatable means in the opposite direction to move said plunger to its normal position and thereby said release valve seat out of engagement with said release valve to open the release communication, and adjusting means associated with said rotatable means and said plunger for adjusting the position of said plunger relative to said release valve upon movement of said plunger to its normal position.

CECIL S. KELLEY.